Figure 1:
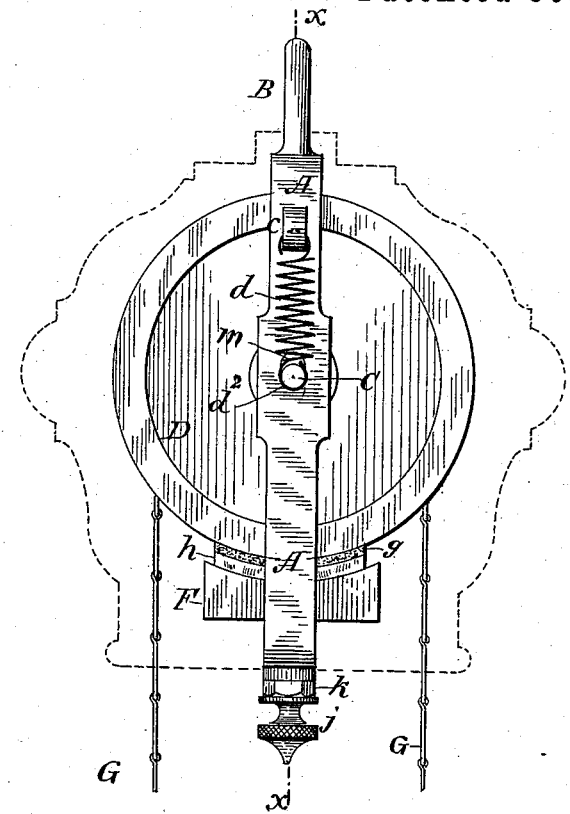

(No Model.) 3 Sheets—Sheet 1.

L. F. GRISWOLD.
SUSPENSION DEVICE FOR LAMPS, &c.

No. 372,260. Patented Oct. 25, 1887.

ATTEST:
J. H. Mudle
A. M. Williamson

INVENTOR:
Lewis F. Griswold
By J. N. McIntire
Attorney (No Model.) 3 Sheets—Sheet 2.

L. F. GRISWOLD.
SUSPENSION DEVICE FOR LAMPS, &c.

No. 372,260. Patented Oct. 25, 1887.

ATTEST:
J. A. Mundle
A. M. Williamson

INVENTOR:
Lewis F. Griswold
By J. N. McIntire
Attorney (No Model.) 3 Sheets—Sheet 3.
L. F. GRISWOLD.
SUSPENSION DEVICE FOR LAMPS, &c.
No. 372,260. Patented Oct. 25, 1887.
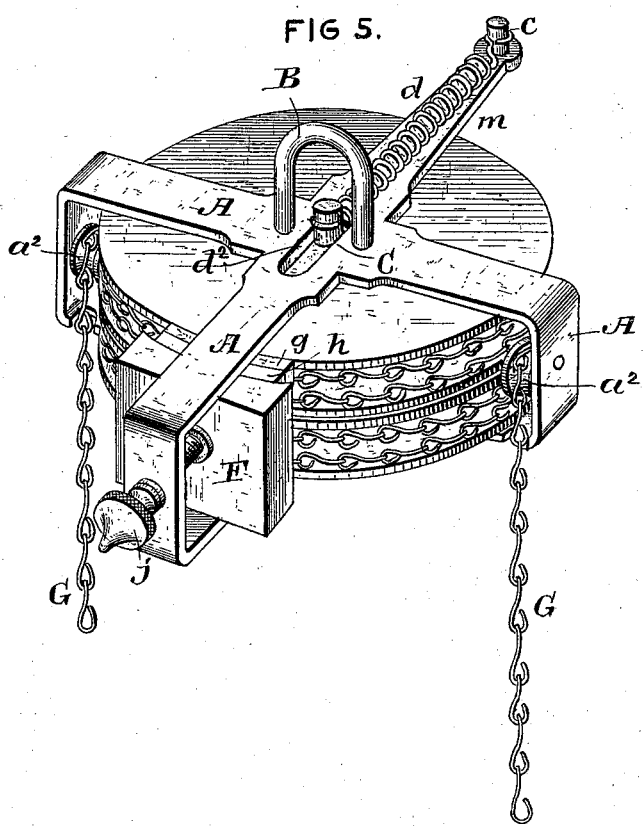
ATTEST.
J. Henry Kaiser
Victor J. Evans
INVENTOR.
Lewis F. Griswold
By J. N. McIntire
Atty.

UNITED STATES PATENT OFFICE.

LEWIS F. GRISWOLD, OF MERIDEN, CONNECTICUT, ASSIGNOR TO THE CHARLES PARKER COMPANY, OF SAME PLACE.

SUSPENSION DEVICE FOR LAMPS, &c.

SPECIFICATION forming part of Letters Patent No. 372,260, dated October 25, 1887.

Application filed April 8, 1887. Serial No. 234,128. (No model.)

*To all whom it may concern:*

Be it known that I, LEWIS F. GRISWOLD, of Meriden, in the county of New Haven and State of Connecticut, have invented a new and useful Improvement in Suspension Devices for Lamps, &c.; and I do hereby declare that the following is a full, clear, and exact description thereof, reference being had to the accompanying drawings, making part of this application.

My invention relates to that species of spring-balance suspension devices or mechanisms in which the wheel or wheels upon which are wound the cords or chains by which the lamp or other article is suspended meet with some sort of frictional impediment to their rotatory movement when turning in the direction necessary to the descent of the suspended article, but revolve free of any such impediment or restraint wherever they turn in the opposite direction to wind up the suspensory chains, the brake or impediment to the free rotation of such wheel or wheels being automatically brought into and thrown out of action.

I propose by my invention to provide for use a spring-balance suspension contrivance of the species above alluded to, in which, by means of a simple spring-drum device mounted to move bodily and axially in a suitable supporting-frame, and a brake device also mounted in said frame, a perfectly efficient and durable contrivance is afforded for the purpose mentioned, and in which, furthermore, by a novel combination or arrangement of the chain or cord, wheels with the winding-up spring, and the axis or spindle of the wheels, a mode of operation is attained such as to render unnecessary the use of any of the usually-employed devices for the purpose of neutralizing any uneven winding-up or unwinding of the separate runs of the suspender-chains; and to these main ends and objects my invention may be said to consist, essentially, first, in a suspension device or contrivance in which the spring drum or drums has or have its or their axis or arbor mounted movably, in a direction transverse to the axis of motion, within the frame of the machine, and in which there is combined with said frame and said movably-mounted drum a friction brake or brake-shoe adapted to co-operate with peripheral brake-surfaces on the spring drum or drums, all as will be hereinafter more fully explained, and as will be most particularly pointed out and defined in the claims of this specification; second, in a novel combination or arrangement of the chain or cord wheels with the winding-up spring and the axis of rotation of the wheels, in which combination, by reason of the wheels being always necessarily evenly acted upon by the motive spring, the tendency in each wheel to rotate on its axis is precisely the same in degree as that of the other, and therefore the separate runs of suspensory chains will always operate precisely alike when subjected to the same gravitating influences, all as will be hereinafter more fully explained, and as will be most particularly pointed out and clearly defined in the claims of this specification.

To enable those skilled in the art to which my improvement relates to make and use a suspension device or contrivance involving my invention, I will now proceed to more fully describe the construction and operation of such a device, referring by letters to the accompanying drawings, which form part of this specification, and in which I have shown the two parts of my invention carried out in that form of machine in which I have so far successfully used my said improvement.

Figure 2:
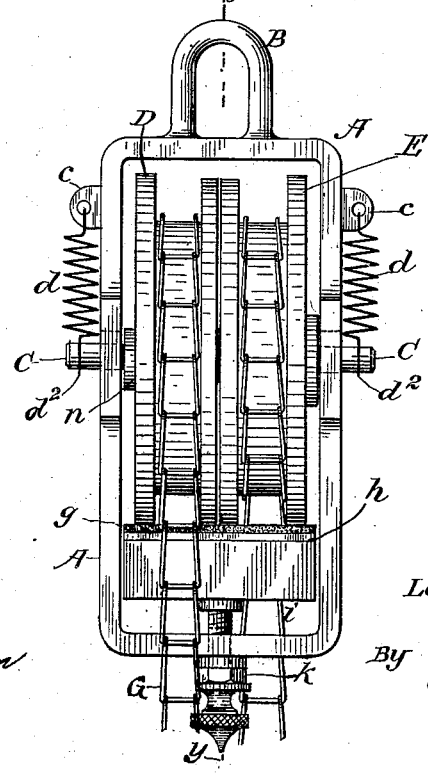
Figure 3:
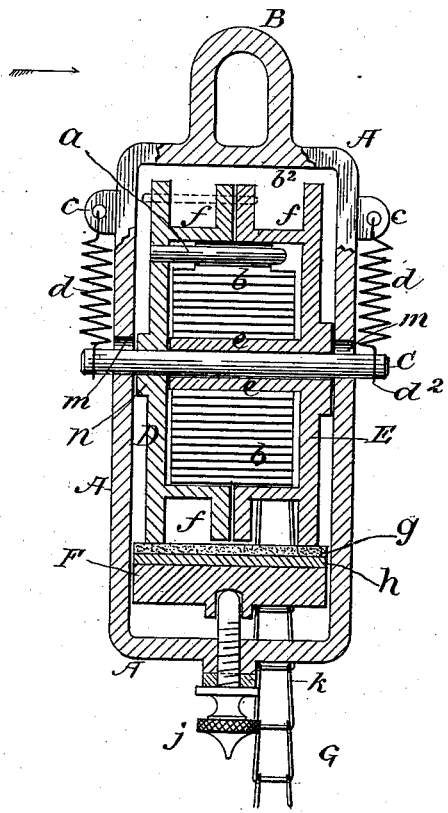
Figure 4:
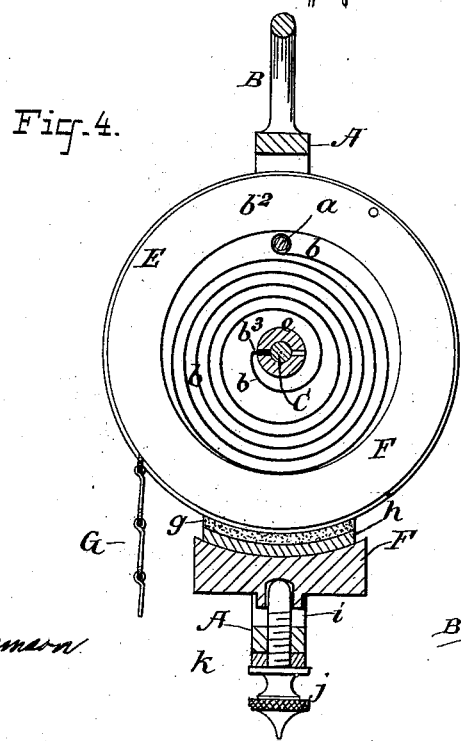

In the drawings, Figure 1 is a side view or elevation of my improved machine. Fig. 2 is an edge view of the same. Fig. 3 is a vertical section at the line $x\,x$ of Fig. 1. Fig. 4 is a vertical section at the line $y\,y$ of Fig. 2. Fig. 5 is a perspective view of a machine embracing my invention, but adapted, as shown, to be placed so that its drums occupy a horizontal instead of a vertical position.

In the several figures the same parts will be found designated by the same letters of reference.

A is a rectangular metallic frame, somewhat similar to the frames heretofore used in analogous contrivances, formed or provided at its upper end with a loop, B, by means of which it may be suspended, and having oblong or slot-like perforations in its two vertical sides arranged opposite to each other, as seen at $m$, within which perforations is placed the shaft or axis C, which is arranged, as seen, transversely of the frame, (see Figs. 2 and 3,) and on which are mounted, preferably so as to turn freely thereon, the two chain-wheels D and E, the first-named one of which wheels has a comparatively short hub, n, (see Fig. 3,) while the other one has a long hub, (or inwardly-projecting tubular extension,) e, which surrounds nearly or quite all that part of the shaft C that lies between the outer end of the hub of wheel E and the inner side of the hub n of the wheel D. The object of this comparatively long hub e to the wheel E will be presently explained.

Each of the chain-wheels has a deep peripheral groove, formed, preferably, as shown at f, within which is wound the chain G, which I prefer to have of that species known as "flat-wire chain," but which, of course, can be of any suitable form, and in place of which may be used, if deemed expedient, a cord or rope.

From any suitable or desired point in the side of wheel D, preferably quite near to the internal face of its rim, there projects inwardly a pin or stud, a, securely fastened at its root to the wheel, and onto which is slipped the looped or turned end of the flat coiled spring b, (see Figs. 3 and 4,) as clearly shown, the pin or stud a being projected nearly over to the inner surface of the side of the other wheel, E, so that the eye or loop $b^2$, formed at the end of the spring b, (see Figs. 3 and 4,) will have the pin a extended clear through it.

The spring b is made, preferably, of a metallic ribbon of such width as to almost completely fill in the direction of the axes of the wheels D and E the space between the inner surfaces of the sides of said wheels, as plainly seen at Fig. 3, and the opposite end of said spring b is secured to or engaged with the long hub or tubular portion e of the wheel E by having the end portion $b^3$ bent and inserted within a longitudinal slot or cut in the portion e of the wheel E, all as plainly shown in the drawings. (See Fig. 4.) By this combined arrangement of the two wheels having a common axis of motion, and the flat coiled spring secured at one end to one of said wheels and at the other end to the other of said wheels, the result is that whenever the said spring shall have been wound up to any extent whatever by a relative rotation or movement of either or both of said wheels in opposite directions about the axis of shaft C the operation and effect of the wound-up spring, in its tendency to turn the wheels relatively, so as to unwind itself, will be exactly alike on each of the two wheels.

F is a brake or brake-shoe, which is located, preferably, within the lower portion of the frame A and in close proximity to the lower portions of the peripheries of the two chain-wheels D and E. Said brake-shoe or brake-block preferably has its working-side faced with a layer of wood, h, on top of which is fastened a piece of leather, g, that is designed to form the contacting surface with the peripheries of the flange-like portions of the rims of the two wheels D and E; but this brake-block may of course be made otherwise than shown without materially changing the novel principle of operation of my improved contrivance.

The brake-block F is preferably mounted on and supported by a set-screw, i, which works within a nut formed in the bottom portion or base-bar of the frame A, (see Figs. 2, 3, and 4,) and which has its upper end slipped in or accommodated within a socket or depression in the lower middle portion of the block F, all as clearly illustrated, (see particularly Figs. 3 and 4,) and said screw i is formed or provided, as shown, with a knurled head, j, by means of which it may conveniently be turned by hand, and it is provided, also, by preference, with a jam-nut, as shown at k, for tightening it in any position to which it may be turned to raise or lower the brake-shoe F, in order to move the face of the latter into more or less forcible contact with the flange-like peripheries of the chain-wheels, for a purpose to be presently further explained.

At either side of the frame A, near its upper end, project laterally lugs or ear-pieces c, each of which is perforated, and from each of which depends, as clearly shown, a spring-suspender device, d, the lower loop-like end, $d^2$, of which partially or wholly encircles one of the protruding ends of the shaft C, for a purpose to be presently described.

Any suitable means may be provided for temporarily holding the two wheels D and E in an engaged or interlocked condition after the spring b shall have been wound up, and until the contrivance shall have been hung up, the suspensory chains adjusted, and the lamp or other article to be suspended secured to the lower ends of said chain. In the case shown I have adopted the simple expedient of holes made through the flanges of the chain-wheels and a pin which I run into or through said holes, as indicated in dotted lines at Fig. 3, to hold the wheels in juxtaposition with the spring wound up until the contrivance, with the article to be suspended, shall have been put in working condition.

I have shown the two outer flanges of the combined chain-wheels as of slightly greater circumference than the others, so that, as clearly shown, the face of the brake-shoe F will bear on them only, (see Fig. 3,) because I have found that sufficient brake-power may be obtained in this way; but, if deemed expedient, the brake may be allowed to come into contact with all of the flanges of both wheels, which flanges in that case may be made with narrower peripheral faces, if found desirable to so make them.

In the operation of a suspension contrivance such as I have shown and so far described, the spring having been wound up to the proper or requisite extent, the wheels D and E temporarily interlocked, (to prevent any relative movement thereof and unwinding of the spring,) and the chains adjusted and the lamp or other article properly secured to the lower ends of said chains, the temporary wheel-locking pin is removed and the suspended article allowed to exert its gravity, through the chains G, in a direction which tends to cause the chains to turn each of the wheels D and E in an opposite direction to that in which the spring $b$, by its tendency to unwind, (or return to its normal condition,) operates to turn each of said wheels. At the same time, by turning the set-screw $i$, the brake-block F is forced up into contact with the peripheries of the two outer flanges of the two wheels to the proper degree to excite a sufficiency of friction, and hence a sufficient impediment, as usual, to the turn of the wheels to effect the retention, by the duplex spring-drum, of the suspended lamp or other article in any position to which it may be adjusted by hand, the frictional impediment to the turning of the wheels in that direction which permits the descent of the suspended article added to the power of the spring, which tends to lift the article, operating (as usual in the type of contrivances to which my invention relates) to insure the holding up of the article at any elevation to which it may be pulled down. Whenever, however, the suspended article is lifted by hand, so as to relieve the suspensory chain, either partially or wholly, of the weight or gravity of said article, the duplex spring-drum (as usual in the type of devices to which my invention relates) is actuated by the spring $b$ in such manner as to effectuate the turning of the two wheels D and E, (in opposite directions,) in the manner necessary to wind up the suspensory chains as fast as the lifting or partially lifting upward of the article will permit, because the moment the article is lifted by hand the gravity of the wheels and all that was suspended therefrom by the chains G will have been reduced, so that not only will the friction between the brake-shoe and the flanges of the chain-wheels (the friction being as to the gravitating pressure of the wheels on the brake) be lessened; but, furthermore, the suspender-springs $d$, which tend always to lift the shaft C, will then be permitted, by reason of the releasement of the wheels and their depending chains from quite or nearly all of the weight of the suspended article, to lift up the shaft C more or less, so as to lift the contacting surfaces of the wheels' flanges either partially or wholly out of frictional engagement with the brake-shoe. Thus by the releasement of the wheels and their depending chains from part or all of the gravity of the suspended article will the operation and effect of the brake which impedes the turning of the wheels in pulling down the suspended article be automatically nullified, or thrown into a state of either partial or complete inaction.

The principle of construction and mode of operation by which the desired results are thus attained in the case of my improved machine, by the merely moving out of forcible contact, automatically, of the brake device and that part or parts of a spring drum or drums with which the brake coacts to induce the necessary impediment to the turning of the drum or drums during any descending movement of the suspended article, I believe to be wholly original with me; and I wish it to be understood that, as to this part of my invention, it is not material what precise details of construction or particular arrangements of parts be adopted, so long as the machine or contrivance involves said novel principle of construction and mode of operation.

Of course neither the principle of construction nor mode of operation of the machine shown would be materially changed by simply suspending the contrivance sidewise of the frame A, (instead of endwise, as seen in the drawings,) and providing it with the necessary additional devices of suitable idlers or guide-wheels, over which the directions of the chains G would be varied as they passed horizontally off from the chain-wheels to the necessary vertical condition for the suspension of the article to be supported. Under such a mode of using the contrivance the only difference would be (which would be merely colorable) that during the support of the suspended article the frictional power of the brake would be in proportion to the gravity of said article and the supporting-chains, unsupplemented by the weight or gravity of the chain-wheels and motive spring, the latter devices being supported in a position such as not to have any gravitating influence toward the brake-shoe.

It will be seen that in a machine made as shown and described, with two chain-wheels adapted to rotate in opposite directions, and connected, respectively, with the opposite ends of a single spring, the action of the spring (when either partially or wholly wound up) must be exactly alike on the two wheels; in other words, supposing the two wheels to have suspended by their respective chains exactly similar weights, the one spring must operate to turn the two wheels and wind up their respective chains and weight in precisely the same manner. Therefore all the liability to a more or less unlike or uneven action of the two runs of suspensory chains (even when said chains are acted upon by similar weights) that is common to all spring-balance suspension devices heretofore used, and that has necessitated the use of what are sometimes called "eveners," is wholly overcome and the use of any sort of evener or compensating device rendered wholly unnecessary. This advantage from that part of my invention which lies, mainly, in the use of two wheels coupled with the opposite ends of a single spring, and which I have called the second part of my improvements, I deem of importance, and as to this part of my invention I wish it to be understood that it is not material whether the precise form of machine I have shown or some other be used, so long as the machine involve this novel principle of construction and mode of operation by which the two wheels are, so to speak, held in perfect equilibrium as to the influence upon them of the spring as a motor.

What I claim as new, and desire to secure by Letters Patent, is—

1. In a spring-balance suspension contrivance or machine, the combination, with a suitable frame, (for supporting the working parts,) of a brake device adapted to coact with the peripheral surfaces of a drum or drums, and a chain drum or drums provided with an actuating spring or springs, and bodily movable in a direction transverse to the axis of rotation toward and from said brake device, all in substantially the manner and for the purpose hereinbefore described.

2. In a spring-balance suspension contrivance or machine, the combination, with any suitable frame for the proper support of the working parts, of two chain or cord wheels having a common axis of motion, and an intermediately-arranged motive spring having its ends coupled, respectively, to the two wheels, substantially as and for the purpose hereinbefore set forth.

In witness whereof I have hereunto set my hand this 4th day of April, 1887.

LEWIS F. GRISWOLD.

In presence of—
N. H. CAMP,
R. A. PALMER.